(12) United States Patent
Kim

(10) Patent No.: US 11,999,142 B2
(45) Date of Patent: Jun. 4, 2024

(54) LIGHT AND THIN SOUND-ABSORBING MATERIAL AND METHOD OF MANUFACTURING SAME

(71) Applicants: Hyundai Motor Company, Seoul (KR); Kia Corporation, Seoul (KR)

(72) Inventor: Seong Je Kim, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 290 days.

(21) Appl. No.: 17/503,795

(22) Filed: Oct. 18, 2021

(65) Prior Publication Data
US 2022/0143961 A1    May 12, 2022

(30) Foreign Application Priority Data
Nov. 6, 2020   (KR) .................. 10-2020-0147679

(51) Int. Cl.
| | |
|---|---|
| *B32B 27/12* | (2006.01) |
| *B32B 27/36* | (2006.01) |
| *B32B 27/40* | (2006.01) |
| *B32B 37/18* | (2006.01) |
| *G10K 11/168* | (2006.01) |

(52) U.S. Cl.
CPC .............. *B32B 27/12* (2013.01); *B32B 27/36* (2013.01); *B32B 27/40* (2013.01); *B32B 37/182* (2013.01); *G10K 11/168* (2013.01); *B32B 2262/0253* (2013.01); *B32B 2262/0276* (2013.01); *B32B 2307/102* (2013.01)

(58) Field of Classification Search
CPC ......... B32B 27/12; B32B 27/36; B32B 27/40; B32B 37/182; B32B 2262/0253; B32B 2262/0276; B32B 2307/102
See application file for complete search history.

(56) References Cited

U.S. PATENT DOCUMENTS

| | | | | |
|---|---|---|---|---|
| 8,727,417 | B2 * | 5/2014 | Eguchi ................ | B60R 13/0815 428/95 |
| 2011/0206891 | A1 * | 8/2011 | Eguchi ................ | B60N 3/048 428/95 |
| 2015/0307037 | A1 * | 10/2015 | Kim .................... | G10K 11/168 181/290 |
| 2016/0059799 | A1 * | 3/2016 | Kim .................... | B32B 27/14 156/244.11 |
| 2017/0011729 | A1 * | 1/2017 | Lee .................... | B32B 27/306 |
| 2017/0341272 | A1 * | 11/2017 | Vogt ................... | B32B 27/06 |

(Continued)

FOREIGN PATENT DOCUMENTS

| | | | | |
|---|---|---|---|---|
| AU | 2014237612 A1 * | 11/2015 | ............. | B29C 59/04 |
| KR | 101643689 B1 | 7/2016 | | |

*Primary Examiner* — Forrest M Phillips
(74) *Attorney, Agent, or Firm* — Slater Matsil, LLP

(57) ABSTRACT

An embodiment sound-absorbing material including a surface layer including low-melting (LM) fibers and melt-blown (MB) fibers and a sound-absorbing layer disposed on at least one side of the surface layer. An embodiment method of manufacturing a sound-absorbing material includes spinning melt-blown (MB) fibers, manufacturing a surface layer by mixing the melt-blown (MB) fibers with low-melting (LM) fibers, laminating a sound-absorbing layer on the surface layer, and hot-pressing a surface layer/sound-absorbing layer in which the sound-absorbing layer is laminated on the surface layer.

20 Claims, 4 Drawing Sheets

(56) References Cited

U.S. PATENT DOCUMENTS

| | | | | |
|---|---|---|---|---|
| 2018/0147793 A1* | 5/2018 | Arvidson | ................... | B32B 5/24 |
| 2019/0351643 A1* | 11/2019 | Broadaway | ............... | B32B 3/26 |
| 2020/0290310 A1* | 9/2020 | Wang | .................... | B32B 27/288 |
| 2023/0301840 A1* | 9/2023 | Schneider | ......... | A61F 13/49061 |
| | | | | 156/73.2 |

* cited by examiner

LIGHT AND THIN SOUND-ABSORBING MATERIAL AND METHOD OF MANUFACTURING SAME

CROSS-REFERENCE TO RELATED APPLICATIONS

The present application claims the benefit of Korean Patent Application No. 10-2020-0147679, filed on Nov. 6, 2020, which application is hereby incorporated herein by reference.

TECHNICAL FIELD

The present disclosure relates to a thin-film-type sound-absorbing material and a method of manufacturing the same.

BACKGROUND

Various parts such as dash inner/carpet and the like are applied as vehicle interior parts in order to reduce the introduction of noise into the interior. In addition, many sound-absorbing materials are being applied to a variety of parts for reducing noise, such as pillar trim pieces, package trays, crash pads and the like. In particular, the sound-absorbing material for use in the above parts mostly includes a nonwoven PET fabric, and the sound-absorbing material for interior parts mostly includes a sound-absorbing microfiber material manufactured using a melt-blowing (M/B) process. Here, a nonwoven PET fabric is capable of maintaining rigidity but is pressed to be thin due to part layout limitations, making it difficult to realize sound absorption performance, and a sound-absorbing microfiber material exhibits superior sound absorption performance but has to be formed to be relatively thick, and is limited in application to parts requiring rigidity.

Accordingly, it is necessary to develop a sound-absorbing material that is light and thin and exhibits superior rigidity and sound absorption performance despite the decreased weight thereof.

Korean Patent No. 10-1643689 describes information related to the present subject matter.

SUMMARY

The present disclosure relates to a thin-film-type sound-absorbing material and a method of manufacturing the same. Particular embodiments relate to a thin-film=type sound-absorbing material that is light and thin and exhibits superior rigidity and sound absorption performance despite the decreased weight thereof, and a method of manufacturing the same.

Therefore, embodiments of the present disclosure keep in mind problems encountered in the related art, and specific embodiments are as follows.

An embodiment of the present disclosure provides a sound-absorbing material, which includes a thin surface layer, containing low-melting (LM) fibers and melt-blown (MB) fibers having specific features in specific amounts, and a sound-absorbing layer, and a method of manufacturing the same.

The embodiments of the present disclosure are not limited to the foregoing, and will be able to be clearly understood through the following description and to be realized by the means described in the claims and combinations thereof.

An embodiment of the present disclosure provides a sound-absorbing material including a surface layer including low-melting (LM) fibers and melt-blown (MB) fibers and a sound-absorbing layer disposed on at least one side of the surface layer.

The surface layer may include, based on a total of 100 wt % of the surface layer, 10 to 50 wt % of the low-melting (LM) fibers and 50 to 90 wt % of the melt-blown (MB) fibers.

The low-melting (LM) fibers may have a fineness of 3 to 5 denier and a length of 40 to 60 mm.

The melt-blown (MB) fibers may have an average diameter of 0.3 to 10 μm.

The weight of the surface layer may be 30 to 300 gsm, and the thickness of the surface layer may be 0.1 to 2 mm.

The sound-absorbing layer may include at least one selected from the group consisting of polyethylene terephthalate (PET) and polyurethane.

The sound-absorbing material may further include a sound-insulating layer interposed between the surface layer and the sound-absorbing layer, the sound-insulating layer including at least one selected from the group consisting of polypropylene (PP), polycarbonate (PC), polyamide 6 (PA6), polyamide 66 (PA66), polyvinyl chloride (PVC), thermoplastic olefin (TPO), thermoplastic elastomer (TPE), and ethylene vinyl acetate (EVA).

The sound-absorbing material may further include a skin layer formed on the surface layer, the skin layer including at least one selected from the group consisting of polyester fiber and polypropylene fiber.

Another embodiment of the present disclosure provides a method of manufacturing a sound-absorbing material, the method including spinning melt-blown (MB) fibers, manufacturing a surface layer by mixing the spun melt-blown (MB) fibers with low-melting (LM) fibers, laminating a sound-absorbing layer on the surface layer, and hot-pressing a surface layer/sound-absorbing layer configured such that the sound-absorbing layer is laminated on the surface layer.

The spinning of the melt-blown (MB) fibers may be performed at a spinning temperature of 230 to 300° C. and a spinning pressure of 4 to 8 psi.

The manufacturing of the surface layer may include hot-pressing fibers obtained by mixing the melt-blown (MB) fibers with the low-melting (LM) fibers and cutting the hot-pressed fibers.

Embodiments of the present disclosure pertain to a sound-absorbing material and a method of manufacturing the same. The sound-absorbing material according to embodiments of the present disclosure is light and thin and exhibits superior rigidity and sound absorption performance despite the decreased weight thereof. The sound-absorbing material according to embodiments of the present disclosure can be widely applied to vehicle interior parts, and is capable of reducing the weight and thickness of parts, thus simultaneously facilitating layout of a vehicle interior and improving NVH (noise, vibration, and harshness) performance.

The effects of embodiments of the present disclosure are not limited to the foregoing, and should be understood to include all effects that can be reasonably anticipated from the following description.

DETAILED DESCRIPTION OF ILLUSTRATIVE EMBODIMENTS

Figure 1:
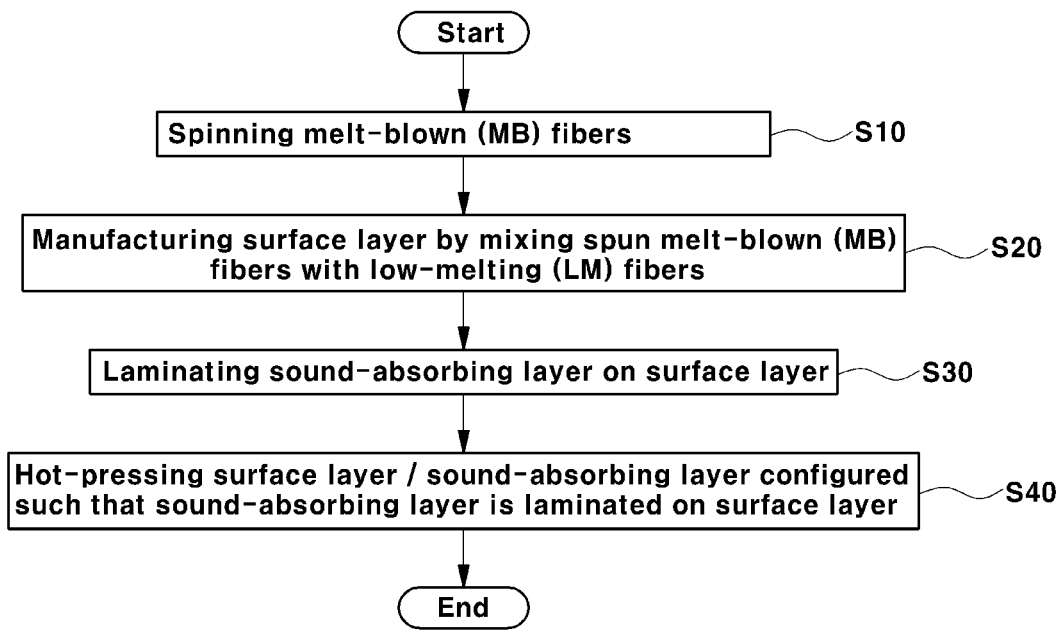
FIG. 1 is a flowchart showing a process of manufacturing a sound-absorbing material according to an embodiment of the present disclosure.

The above and other objectives, features and advantages of embodiments of the present disclosure will be more clearly understood from the following preferred embodiments taken in conjunction with the accompanying drawings. However, the present disclosure is not limited to the embodiments disclosed herein, and may be modified into different forms. These embodiments are provided to thoroughly explain the disclosure and to sufficiently transfer the spirit of the present disclosure to those skilled in the art.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

Conventional sound-absorbing materials used in vehicles typically include nonwoven PET fabrics or sound-absorbing microfiber materials. Here, nonwoven PET fabrics are capable of implementing the shape of parts requiring rigidity and are inexpensive but are heavy and show poor sound absorption performance, and sound-absorbing microfiber materials are relatively light and show superior sound absorption performance but are expensive and make it difficult to implement a desired shape, and are typically applied only to pads. Therefore, the inventors of the present disclosure performed thorough research in order to solve problems in the art, and developed a thin-film-type sound-absorbing material, which is light and thin and exhibits superior rigidity and sound absorption performance despite the decreased weight thereof, and a manufacturing method thereof, thus culminating in the present disclosure.

Sound-Absorbing Material

According to an embodiment of the present disclosure, a sound-absorbing material includes a surface layer and a sound-absorbing layer disposed on at least one side of the surface layer.

In an embodiment of the present disclosure, the surface layer is not particularly limited, so long as it is able to reduce the weight and thickness of the sound-absorbing material including the same and also to improve sound absorption performance. Preferably, the surface layer according to an embodiment of the present disclosure includes low-melting (LM) fibers and melt-blown (MB) fibers. Moreover, the surface layer according to an embodiment of the present disclosure may be included in the form of a double structure in the sound-absorbing material.

The low-melting (LM) fibers may include fibers capable of serving as a binder in the surface layer of the present disclosure, for example, those including at least one selected from the group consisting of a low-melting-point polyester resin, a general polyester resin, a polyamide resin, a polypropylene resin, a polyamide 6 resin, and a polyamide 66 resin. Although not limited to including a specific component, fibers obtained by multi-spinning a low-melting-point polyester resin capable of melting at a temperature of about 110° C. and thus of being thermoformed and having high heat resistance and a general polyester resin are preferable.

The low-melting (LM) fibers may have a fineness of 3 to 5 denier and a length of 40 to 60 mm. If the fineness of the low-melting fibers falls outside the above range, specifically, if the fineness thereof is too low, processing costs may increase and productivity may decrease, whereas if the fineness thereof is too high, sound absorption performance may decrease. Also, if the length of the low-melting fibers falls outside the above range, specifically, if the length thereof is too short, mechanical properties may deteriorate, whereas if the length thereof is too long, productivity may decrease.

The melt-blown (MB) fibers may include fibers that are not oriented in any one direction, for example, those including at least one selected from the group consisting of a low-melting-point polypropylene resin, a polyamide resin, a polypropylene resin, a polyamide 6 resin, a polyethylene resin, and a polyamide 66 resin. Although not limited to including a specific component, fibers obtained by subjecting a low-melting-point polyester resin capable of melting at a temperature of about 110° C. and thus of being thermoformed and having high heat resistance to spinning under high-temperature and high-pressure conditions are preferable.

The melt-blown (MB) fibers may have an average diameter of 0.3 to 10 μm. Here, if the average diameter of the melt-blown fibers is too short, production costs may increase due to the need to perform processing under high-temperature and high-pressure conditions, whereas if the average diameter thereof is too long, sound absorption performance may deteriorate.

The surface layer according to an embodiment of the present disclosure having the above features may include, based on a total of 100 wt % of the surface layer, 10 to 50 wt % of the low-melting (LM) fibers, and 50 to 90 wt % of the melt-blown (MB) fibers. If the amount of the low-melting (LM) fibers is too small, adhesion of the surface layer to the sound-absorbing layer may decrease and the durability of the sound-absorbing material including the same may deteriorate. On the other hand, if the amount thereof is too high, sound absorption performance may deteriorate. Also, if the amount of the melt-blown (MB) fibers is too small, sound absorption performance may deteriorate, whereas if the amount thereof is too high, formability may decrease and shape retention may become difficult.

Briefly, the surface layer according to an embodiment of the present disclosure may satisfy the amount and characteristics described above and may thus have a weight of 30 to 300 gsm and a thickness of 0.1 to 2 mm. The gsm is in grams per square meter, meaning the weight (g) of 1 m² (square meter), that is, 1 m in width and 1 m in length. Therefore, the sound-absorbing material according to an embodiment of the present disclosure including the surface layer is light and thin and exhibits superior rigidity and sound absorption performance despite the decreased weight thereof.

The sound-absorbing layer according to an embodiment of the present disclosure is not particularly limited, so long as it is able to improve the sound absorption performance of a sound-absorbing material including the same.

The sound-absorbing layer according to an embodiment of the present disclosure may be a typical sound-absorbing layer capable of being used in the present disclosure, for example, a layer including at least one selected from the group consisting of polyethylene terephthalate (PET), polyurethane, miscellaneous felt, resin felt, and honeycomb board. Although not limited to a specific component, polyethylene terephthalate (PET), both having superior formability, or polyurethane is preferable.

Meanwhile, the sound-absorbing material according to an embodiment of the present disclosure may further include a sound-insulating layer or a skin layer. The sound-insulating layer is preferably interposed between the surface layer and the sound-absorbing layer. The sound-insulating layer may be a typical sound-insulating layer capable of being used in embodiments of the present disclosure, for example, a layer including at least one selected from the group consisting of polypropylene (PP), polycarbonate (PC), polyamide 6 (PA6), polyamide 66 (PA66), polyvinyl chloride (PVC), thermoplastic olefin (TPO), thermoplastic elastomer (TPE), and ethylene vinyl acetate (EVA). Although not limited to a specific component, polypropylene (PP), polycarbonate (PC), polyamide 6 (PA6), or polyamide 66 (PA66), each of which may be provided in the form of a film having holes in the surface thereof so as to be air permeable, is preferable. In addition, the skin layer is preferably disposed on the surface layer, and is more preferably positioned so as not to overlap the sound-absorbing layer. The skin layer may be a typical skin layer capable of being used in embodiments of the present disclosure, for example, a layer including at least one selected from the group consisting of polyester (PE) fiber and polypropylene (PP) fiber. Although not limited to a specific component, polyester fiber, having high heat resistance and formability, is preferable.

Therefore, the sound-absorbing material according to an embodiment of the present disclosure having the above characteristics is light and thin and exhibits superior rigidity and sound absorption performance despite the decreased weight thereof. The sound-absorbing material according to embodiments of the present disclosure may be widely applied to vehicle interior parts, and is capable of reducing the weight and thickness of parts, thus simultaneously facilitating layout of a vehicle interior and improving NVH (noise, vibration, and harshness) performance.

Method of Manufacturing Sound-Absorbing Material

FIG. 1 is a flowchart showing the process of manufacturing a sound-absorbing material according to an embodiment of the present disclosure. With reference thereto, the method of manufacturing the sound-absorbing material according to embodiments of the present disclosure includes spinning melt-blown (MB) fibers (S10), manufacturing a surface layer by mixing the spun melt-blown (MB) fibers with low-melting (LM) fibers (S20), laminating a sound-absorbing layer on the surface layer (S30), and hot-pressing a surface layer/sound-absorbing layer configured such that the sound-absorbing layer is laminated on the surface layer (S40).

Spinning the melt-blown (MB) fibers (S10) is a step of spinning melt-blown fibers under high-temperature and high-pressure conditions. Preferably, the melt-blown fibers are spun at a spinning temperature of 230 to 300° C. and a spinning pressure of 4 to 8 psi. Here, if the spinning temperature is too low, there may occur a problem of low productivity in that the fibers are cut off during spinning, whereas if the spinning temperature is too high, fibers may be carbonized and thus the properties thereof may deteriorate. In addition, if the spinning pressure is too low, it is impossible to produce thin fibers, so sound absorption performance may deteriorate, whereas if the spinning pressure is too high, productivity may decrease due to device overload.

Manufacturing the surface layer (S20) is a step of manufacturing a surface layer including mixed fibers obtained by mixing the spun melt-blown (MB) fibers with low-melting (LM) fibers.

The surface layer may be manufactured by collecting the mixed fibers. Also, manufacturing the surface layer may include hot-pressing fibers obtained by mixing the melt-blown (MB) fibers with the low-melting (LM) fibers and cutting the hot-pressed fibers.

Laminating the sound-absorbing layer on the surface layer (S30) is a step of manufacturing a surface layer/sound-absorbing layer configured such that the sound-absorbing layer is laminated on the surface layer obtained by collecting the mixed fibers or through hot-pressing and cutting. The lamination process may include a typical process capable of being used in embodiments of the present disclosure, for example, feeding the sound-absorbing layer through a side roller onto the surface layer that is hot-pressed through a main roller so that the surface layer and the sound-absorbing layer are laminated together, feeding the surface layer that is hot-pressed with a roller to a process of forming the sound-absorbing layer using a side roller so that the surface layer and the sound-absorbing layer are laminated together, or manually laminating the cut sound-absorbing layer on the surface layer produced after hot-pressing and cutting.

Hot-pressing the surface layer/sound-absorbing layer configured such that the sound-absorbing layer is laminated on the surface layer (S40) is a step of hot-pressing the surface layer/sound-absorbing layer to thereby complete the manufacture of a sound-absorbing material.

Therefore, the sound-absorbing material manufactured by the manufacturing method according to an embodiment of the present disclosure is light and thin and exhibits superior rigidity and sound absorption performance despite the decreased weight thereof. The sound-absorbing material according to embodiments of the present disclosure may be widely applied to vehicle interior parts, and is capable of reducing the weight and thickness of parts, thus simultaneously facilitating layout of a vehicle interior and improving NVH (noise, vibration, and harshness) performance.

A better understanding of embodiments of the present invention will be given through the following examples, which are merely set forth to illustrate embodiments of the present invention and are not to be construed as limiting the scope of the present invention.

Example 1: Sound-Absorbing Material Manufactured by Method of Embodiments of the Present Disclosure (S10) Melt-blown fibers produced by spinning a low-melting-point polyester resin having a melting point of 100° C. and a fineness of 4 denier were spun under the conditions of a spinning temperature of 245° C. and a spinning pressure of 6.7 psi.

(S20) The spun melt-blown fibers were mixed with low-melting (LM) fibers obtained by multi-spinning a low-melting-point polyester resin and a general polyester resin to afford a surface layer. Specifically, the collected mixed fibers of melt-blown fibers and polyester resin were hot-pressed under conditions of a temperature of 80 to 100° C. and a pressing roller interval of 0 t, thereby forming a surface layer. The surface layer specifically includes 90 wt % of the melt-blown (MB) fibers and 10 wt % of the low-melting (LM) fibers based on a total of 100 wt % of the surface layer, and has a weight of 45 gsm and a thickness of about 0.2 mm.

(S30) A sound-absorbing layer was laminated on the surface layer manufactured above in a manner in which the sound-absorbing layer was fed through a side roller onto the surface layer that was hot-pressed through a main roller, thereby manufacturing a surface layer/sound-absorbing layer. Here, the sound-absorbing layer is a PET plush felt having a weight of 400 gsm and a thickness of 10 mm.

(S40) The surface layer/sound-absorbing layer manufactured above was hot-pressed, thereby completing the manufacture of a sound-absorbing material. Specifically, the hot-pressing temperature for manufacturing the sound-absorbing material is 80 to 120° C. and the inner thickness of a mold is set to 10 mm.

Example 2: Sound-Absorbing Material Manufactured by Method of Embodiments of the Present Disclosure A sound-absorbing material was manufactured in the same manner as in Example 1, with the exception that a vertical nonwoven fabric was used as the sound-absorbing layer, in contrast with Example 1.

Example 3: Sound-Absorbing Material Manufactured by Method of Embodiments of the Present Disclosure A sound-absorbing material was manufactured in the same manner as in Example 1, with the exception that semi-rigid polyurethane (PU) foam (18K, 20 T) was used as the sound-absorbing layer, in contrast with Example 1.

Comparative Example 1: Sound-Absorbing Material Manufactured Using Surface Layer in Different Amounts A sound-absorbing material was manufactured in the same manner as in Example 1, with the exception that a surface layer including 95 wt % of melt-blown (MB) fibers and 5 wt % of low-melting (LM) fibers based on a total of 100 wt % of the surface layer was manufactured, in contrast with Example 1.

Comparative Example 2: Sound-Absorbing Material Manufactured Using Surface Layer in Different Amounts A sound-absorbing material was manufactured in the same manner as in Example 1, with the exception that a surface layer including 40 wt % of melt-blown (MB) fibers and 60 wt % of low-melting (LM) fibers based on a total of 100 wt % of the surface layer was manufactured, in contrast with Example 1.

Comparative Example 3 to Comparative Example 6: Conventional Sound-Absorbing Materials A PET plush felt having a weight of 400 gsm and a thickness of 10 mm (Comparative Example 3), a vertical nonwoven fabric having a weight of 400 gsm and a thickness of 10 mm (Comparative Example 4), a PET plush felt having a weight of 800 gsm and a thickness of 20 mm (Comparative Example 5), and a vertical nonwoven fabric having a weight of 600 gsm and a thickness of 20 mm (Comparative Example 6) were used.

Comparative Example 7: Conventional Sound-Absorbing Material

A sound-absorbing material was manufactured in the same manner as in Example 3, except that a PET skin material having a weight of 100 gsm and a thickness of 20 mm was used as the surface layer, in contrast with Example 3.

Evaluation of Properties

Sound absorption performance: a test sample having a size of 0.84 m×0.84 m was placed in a chamber, 15 sound sources ranging from 400 Hz to 10,000 Hz were input, and the sound absorption coefficient of the material for the reverberation thereof was measured and compared (ISO 354).

Shape retention: after allowing a test sample to stand for 240 hours in a heat-resistant chamber at 90° C., adhesion between the sound-absorbing layer and the surface layer was measured.

Test Example 1: Manufacture of Sound-Absorbing Material in Optimal Amount

The sound-absorbing material of each of Example 2 and Comparative Examples 1 and 2 was manufactured, and the sound absorption performance and shape retention thereof were evaluated. The results thereof are shown in Table 1 below.

TABLE 1

| Classification | Properties | |
|---|---|---|
| | Sound absorption performance | Shape retention |
| Example 2 | 0.71 | ○ (good) |
| Comparative Example 1 | 0.71 | X (poor) |
| Comparative Example 2 | 0.60 | ⊚ (very good) |

As is apparent from Table 1, the sound-absorbing material (Example 2), manufactured with the surface layer including melt-blown fibers and low-melting fibers satisfying the amounts according to embodiments of the present disclosure, exhibited superior sound absorption performance and good shape retention. In contrast, the sound-absorbing materials (Comparative Example 1 and Comparative Example 2), manufactured with the surface layer including melt-blown fibers and low-melting fibers not satisfying the amounts according to embodiments of the present disclosure, exhibited the same sound absorption performance but poor shape retention, or exhibited good shape retention but poor sound absorption performance. Specifically, the sound-absorbing material manufactured with the surface layer including melt-blown fibers and low-melting fibers satisfying the amounts according to an embodiment of the present disclosure is advantageous because of the good shape retention and superior sound absorption performance thereof.

Test Example 2: Measurement of Sound Absorption Performance of Sound-Absorbing Material According to Embodiments of the Present Invention The sound-absorbing material of each of Examples 1 and 2 and Comparative Examples 3 and 4 was manufactured, and the sound absorption performance thereof was evaluated. The results thereof are shown in Table 2 below and in FIG. 2.

TABLE 2

| Classification | Total weight (gsm) | Thickness (mm) | Sound absorption performance | Remark |
|---|---|---|---|---|
| Example 1 | 445 | 10 | 0.66 (improved by 57%) | (Compared to Comparative Example 3) |
| Example 2 | 445 | 10 | 0.71 (improved by 53%) | (Compared to Comparative Example 4) |
| Comparative Example 3 | 400 | 10 | 0.42 | — |
| Comparative Example 4 | 400 | 10 | 0.46 | — |

Figure 2:
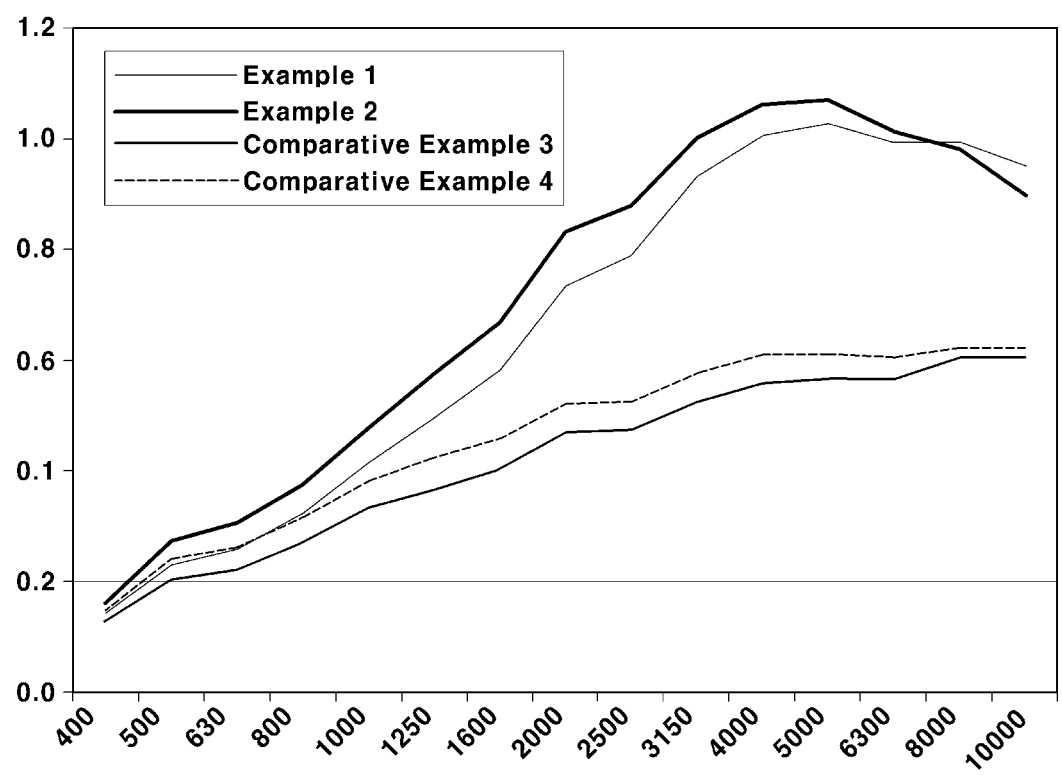
FIG. 2 is a graph showing the sound absorption performance of the sound-absorbing materials of Examples 1 and 2 according to an embodiment of the present disclosure and the sound-absorbing materials of Comparative Examples 3 and 4.

As is apparent from Table 2 and FIG. 2, compared to the sound-absorbing materials of Comparative Examples 3 and 4, the sound-absorbing materials (Example 1 and Example 2) including the surface layer according to embodiments of the present disclosure improved the sound absorption performance by about 53-57% for the same thickness and similar weight. In addition, the sound-absorbing material of each of Examples 1 and 2 and Comparative Examples 5 and 6 was manufactured, and the sound absorption performance thereof was evaluated. The results thereof are shown in Table 3 below and in FIG. 3.

TABLE 3

| Classification | Total weight (gsm) | Thickness (mm) | Sound absorption performance | Remark |
|---|---|---|---|---|
| Example 1 | 445 (reduced by 44%) | 10 (reduced by 50%) | 0.66 (increased by 7%) | (Compared to Comparative Example 5) |
| Example 2 | 445 (reduced by 26%) | 10 (reduced by 50%) | 0.71 (increased by 22%) | (Compared to Comparative Example 6) |
| Comparative Example 5 | 800 | 20 | 0.61 | — |
| Comparative Example 6 | 600 | 20 | 0.58 | — |

Figure 3:
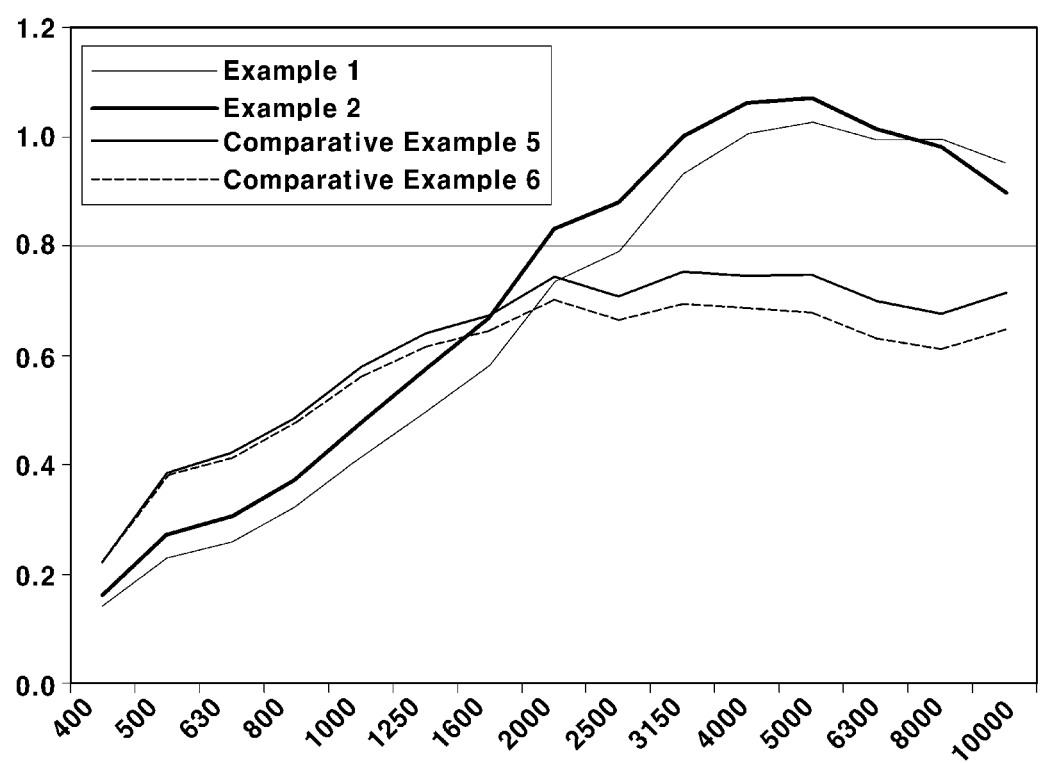
FIG. 3 is a graph showing the sound absorption performance of the sound-absorbing materials of Examples 1 and 2 according to an embodiment of the present disclosure and the sound-absorbing materials of Comparative Examples 5 and 6.

As is apparent from Table 3 and FIG. 3, as for the sound-absorbing material including the surface layer according to embodiments of the present disclosure, rather than increasing the amount of PET plush felt (800 gsm) or the amount of vertical nonwoven fabric (600 gsm), compared to the sound-absorbing materials of Comparative Examples 5 and 6, the total weight and thickness were reduced by 44% and 50%, respectively, and the sound absorption performance was increased by about 7% in Example 1 compared to Comparative Example 5, and the total weight and thickness were reduced by 26% and 50%, respectively, and the sound absorption performance was increased by about 22% in Example 2 compared to Comparative Example 6. In addition, the sound-absorbing material of each of Example 3 and Comparative Example 7 was manufactured, and the sound absorption performance thereof was evaluated. The results thereof are shown in Table 4 below and in FIG. 4.

TABLE 4

| Classification | Total weight (gsm) | Thickness (mm) | Sound absorption performance | Remark |
|---|---|---|---|---|
| Example 3 | 395 g (reduced by 12%) | 20 | 0.88 (increased by 10%) | (Compared to Comparative Example 7) |
| Comparative Example 7 | 450 g | 20 | 0.80 | — |

Figure 4:
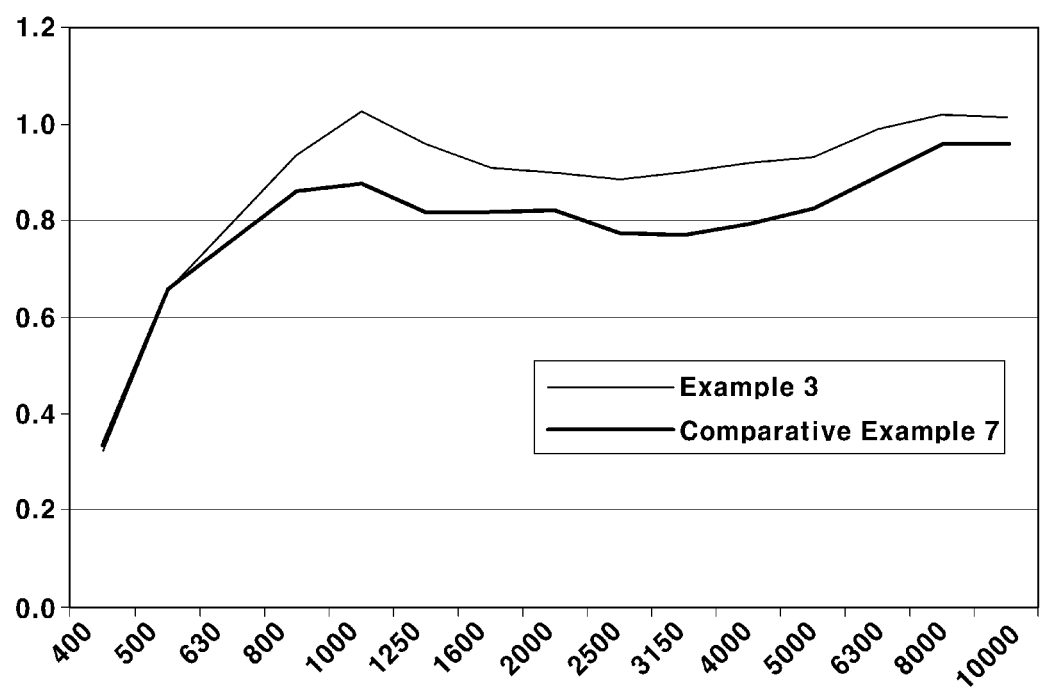
FIG. 4 is a graph showing the sound absorption performance of the sound-absorbing material of Example 3 according to an embodiment of the present disclosure and the sound-absorbing material of Comparative Example 7.

As is apparent from Table 4 and FIG. 4, compared to the sound-absorbing material of Comparative Example 7 including the simple PET skin material of 100 gsm, the sound-absorbing material including the surface layer according to embodiments of the present disclosure reduced the total weight by 12% and increased the sound absorption performance by about 10%. Therefore, the sound-absorbing material according to an embodiment of the present disclosure is light and thin and exhibits superior rigidity and sound absorption performance despite the decreased weight thereof. The sound-absorbing material according to embodiments of the present disclosure can be widely applied to vehicle interior parts, and is capable of reducing the weight and thickness of parts, thus simultaneously facilitating layout of a vehicle interior and improving NVH (noise, vibration, and harshness) performance.

Although specific embodiments of the present disclosure have been described with reference to the accompanying drawings, those skilled in the art will appreciate that the present disclosure may be embodied in other specific forms without changing the technical spirit or essential features thereof. Thus, the embodiments described above should be understood to be non-limiting and illustrative in every way.

What is claimed is:

1. A sound-absorbing material comprising:
a surface layer comprising low-melting (LM) fibers and melt-blown (MB) fibers; and
a sound-absorbing layer disposed on at least one side of the surface layer;
wherein the low-melting (LM) fibers and melt-blown (MB) fibers are mixed in the surface layer; and
wherein the surface layer comprises, based on a total of 100 wt % of the surface layer, 10 to 50 wt % of the low-melting (LM) fibers and 50 to 90 wt % of the melt-blown (MB) fibers.

2. The sound-absorbing material of claim 1, wherein the low-melting (LM) fibers have a fineness of 3 to 5 denier and a length of 40 to 60 mm.

3. The sound-absorbing material of claim 1, wherein the melt-blown (MB) fibers have an average diameter of 0.3 to 10 μm.

4. The sound-absorbing material of claim 1, wherein a weight of the surface layer is 30 to 300 gsm.

5. The sound-absorbing material of claim 1, wherein a thickness of the surface layer is 0.1 to 2 mm.

6. The sound-absorbing material of claim 1, wherein the sound-absorbing layer comprises at least one material selected from the group consisting of polyethylene terephthalate (PET), polyurethane, and mixtures thereof.

7. The sound-absorbing material of claim 1, further comprising a sound-insulating layer interposed between the surface layer and the sound-absorbing layer, the sound-insulating layer comprising at least one material selected from the group consisting of polypropylene (PP), polycarbonate (PC), polyamide 6 (PA6), polyamide 66 (PA66), polyvinyl chloride (PVC), thermoplastic olefin (TPO), thermoplastic elastomer (TPE), ethylene vinyl acetate (EVA), and mixtures thereof.

8. The sound-absorbing material of claim 1, further comprising a skin layer formed on the surface layer, the skin layer comprising at least one material selected from the group consisting of polyester fiber and polypropylene fiber.

9. A method of manufacturing a sound-absorbing material, the method comprising:
spinning melt-blown (MB) fibers;
manufacturing a surface layer by mixing the melt-blown (MB) fibers with low-melting (LM) fibers, wherein the surface layer comprises, based on a total of 100 wt % of the surface layer, 10 to 50 wt % of the low-melting (LM) fibers and 50 to 90 wt % of the melt-blown (MB) fiber;
laminating a sound-absorbing layer on the surface layer; and
hot-pressing a surface layer/sound-absorbing layer in which the sound-absorbing layer is laminated on the surface layer.

10. The method of claim 9, wherein spinning the melt-blown (MB) fibers is performed at a spinning temperature of 230 to 300° C. and a spinning pressure of 4 to 8 psi.

11. The method of claim 9, wherein manufacturing the surface layer comprises:
hot-pressing fibers obtained by mixing the melt-blown (MB) fibers with the low-melting (LM) fibers; and
cutting the hot-pressed fibers.

12. A method of manufacturing a sound-absorbing material, the method comprising:
forming a surface layer comprising low-melting (LM) fibers and melt-blown (MB) fibers; and
forming a sound-absorbing layer on at least one side of the surface layer;
wherein the low-melting (LM) fibers and melt-blown (MB) fibers are mixed in the surface layer; and
wherein the surface layer comprises, based on a total of 100 wt % of the surface layer, 10 to 50 wt % of the low-melting (LM) fibers and 50 to 90 wt % of the melt-blown (MB) fibers.

13. The method of claim 12, wherein forming the surface layer comprises spinning the melt-blown (MB) fibers and mixing the melt-blown (MB) fibers with the low-melting (LM) fibers.

14. The method of claim 12, wherein forming the sound-absorbing layer comprises laminating the sound-absorbing layer on the surface layer.

15. The method of claim 12, wherein the low-melting (LM) fibers have a fineness of 3 to 5 denier and a length of 40 to 60 mm.

16. The method of claim 12, wherein the melt-blown (MB) fibers have an average diameter of 0.3 to 10 μm.

17. The method of claim 12, wherein a weight of the surface layer is 30 to 300 gsm.

18. The method of claim 12, wherein a thickness of the surface layer is 0.1 to 2 mm.

19. The method of claim 12, wherein the sound-absorbing layer comprises at least one material selected from the group consisting of polyethylene terephthalate (PET), polyurethane, and mixtures thereof.

20. The method of claim 12, further comprising forming a skin layer formed on the surface layer, the skin layer comprising at least one material selected from the group consisting of polyester fiber and polypropylene fiber.

* * * * *